United States Patent
Arthur et al.

(10) Patent No.: US 7,736,817 B2
(45) Date of Patent: Jun. 15, 2010

(54) METHOD OF FORMING AN INTERFACE BETWEEN COMPONENTS HAVING DIFFERENT RATES OF EXPANSION

(75) Inventors: Alan R. Arthur, Salem, OR (US); Gary Tarver, Corvallis, OR (US)

(73) Assignee: Hewlett-Packard Development Company, L.P., Houston, TX (US)

(*) Notice: Subject to any disclaimer, the term of this patent is extended or adjusted under 35 U.S.C. 154(b) by 1274 days.

(21) Appl. No.: 10/677,024

(22) Filed: Sep. 30, 2003

(65) Prior Publication Data

US 2005/0069017 A1 Mar. 31, 2005

(51) Int. Cl.
*H01M 8/12* (2006.01)
(52) U.S. Cl. .................. 429/535; 429/507; 429/508
(58) Field of Classification Search .................. 429/32
See application file for complete search history.

(56) References Cited

U.S. PATENT DOCUMENTS

| | | | |
|---|---|---|---|
| 3,577,795 A * | 5/1971 | Bennett | 74/466 |
| 4,781,996 A | 11/1988 | Toriya et al. | |
| 5,374,086 A * | 12/1994 | Higgins | 285/111 |
| 5,799,951 A * | 9/1998 | Anderson et al. | 277/301 |
| 5,807,642 A | 9/1998 | Xue et al. | |
| 6,287,716 B1 | 9/2001 | Hashimoto et al. | |
| 6,494,937 B1 | 12/2002 | Edlund et al. | |
| 6,677,069 B1 * | 1/2004 | Piascik et al. | 429/32 |
| 2002/0142204 A1 * | 10/2002 | Prediger et al. | 429/32 |
| 2003/0063826 A1 * | 4/2003 | Cevasco et al. | 384/537 |

FOREIGN PATENT DOCUMENTS

JP 04-355953 * 12/1992

* cited by examiner

*Primary Examiner*—Jonathan Crepeau
*Assistant Examiner*—Tony Chuo

(57) ABSTRACT

A method of forming an interface between components having different rates of volumetric expansion includes forming an interface surface of the interface with respect to a center of growth such that slippage occurs at the interface between the components during volumetric expansion.

20 Claims, 5 Drawing Sheets

METHOD OF FORMING AN INTERFACE BETWEEN COMPONENTS HAVING DIFFERENT RATES OF EXPANSION

BACKGROUND

During the past several years, the popularity and viability of fuel cells for producing both large and small amounts of electricity has increased significantly. Fuel cells conduct an electrochemical reaction with reactants such as hydrogen and oxygen to produce electricity and heat. Fuel cells are similar to batteries, except that fuel cells can be "recharged" while providing power. In addition, fuel cells are cleaner than other sources of power, such as devices that combust hydrocarbons.

Fuel cells provide a DC (direct current) voltage that may be used to power almost any electrical device, including motors, lights, computers, etc. A typical fuel cell includes an electrolyte disposed between two electrodes: an anode and a cathode. There are several different types of fuel cells, each using a different chemistry. Fuel cells are usually classified by the type of electrolyte used. For example, fuel cells are generally categorized into one of five groups: proton exchange membrane (PEM) fuel cells, alkaline fuel cells (AFC), phosphoric-acid fuel cells (PAFC), solid oxide fuel cells (SOFC), and molten carbonate fuel cells (MCFC).

While all fuel cells have some desirable features, solid oxide fuel cells (SOFC) have a number of distinct advantages over other fuel cell types. Some advantages of SOFCs include reduced problems with electrolyte management, increased efficiencies over other fuel cell types (SOFCs are up to 60% efficient), higher tolerance to fuel impurities, and the possible use of internal reforming or direct utilization of hydrocarbon fuels to produce, for example, hydrogen and methane.

Most SOFCs include an electrolyte made of a solid-state material such as a fast oxygen ion conducting ceramic. In order to provide adequate ionic conductivity in the electrolyte, SOFCs typically operate in the 500 to 1000 C temperature range. As noted above, the electrolyte is disposed between two electrodes: an anode and a cathode. An oxidant such as air is fed to the cathode that supplies oxygen ions to the electrolyte. A fuel such as hydrogen or methane is fed to the anode where the fuel reacts with oxygen ions transported through the electrolyte. This reaction produces electrons, which are then delivered to an external circuit as useful power.

Throughout the operation of an SOFC, the fuel cell is often cycled between room temperature and its full operating temperature. This thermal cycling causes the housing materials to contract and expand according to their coefficients of thermal expansion. This expansion and contraction introduces thermal stresses that may be transferred through the seals and other structural components directly to the ceramic cell. These thermal stresses effectively reduce the service life of an SOFC by compromising the seals or breaking the structurally brittle ceramic cells. Some designs have attempted to minimize the thermal stresses introduced by thermal cycling by the use of compliant members such as springs. However, such springs have a tendency to stress relieve at elevated temperature. To avoid this stress relief, super alloys are often used. These super alloys are expensive and thereby limit the applicability of fuel cell systems that make use of them.

BRIEF DESCRIPTION OF THE DRAWINGS

The accompanying drawings illustrate various embodiments of the present apparatus and method and are a part of the specification. The illustrated embodiments are merely examples of the present apparatus and method and do not limit the scope of the disclosure.

Throughout the drawings, identical reference numbers designate similar, but not necessarily identical, elements.

DETAILED DESCRIPTION

A method of forming a component interface for use between components of differential volumetric growth rates is described herein. In various embodiments, this method may include steps such as determining dimensional characteristics of a component, defining an axis of volumetric expansion, defining a center of growth, defining a sphere centered on the center of growth, projecting the component onto the sphere to define a projection line, and forming an interface where a number of planes defining the interface each include a point on the projection line, the tangent to that point on the projection line, and the center of growth. The surface tangent to each of those planes defines the surface of the desired interface.

As used herein and in the appended claims, interface shall be broadly understood to mean any surface of a component, which may abut or interact with any other surface of another component. In addition, volumetric expansion shall be broadly understood to be any volumetric change due to a change in temperature or any other cause, whether the change results in expansion or contraction of the component in question. The center of growth is a point at which two or more planes containing a portion of an interface or interfaces between two components intersect.

In the following description, for purposes of explanation, numerous specific details are set forth in order to provide a thorough understanding of the present method and apparatus. It will be apparent, however, to one skilled in the art that the present method and apparatus may be practiced without these specific details. Reference in the specification to "one embodiment" or "an embodiment" means that a particular feature, structure, or characteristic described in connection with the embodiment is included in at least one embodiment. The appearance of the phrase "in one embodiment" in various places in the specification are not necessarily all referring to the same embodiment.

Exemplary Structure

Figure 1:
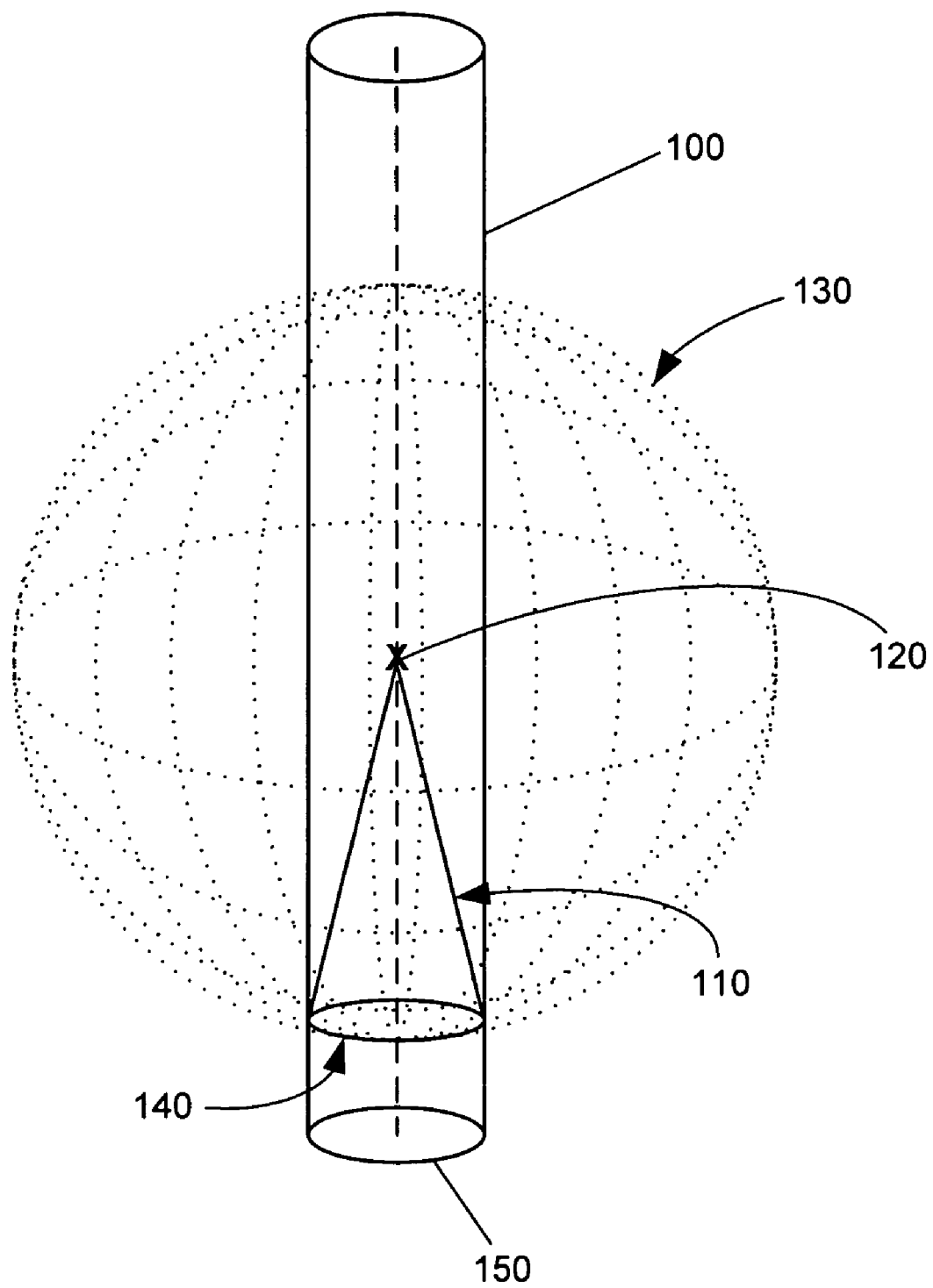
FIG. 1 illustrates a perspective view of a component interface according to one exemplary embodiment.

FIG. 1 is used to illustrate the concepts of the method disclosed herein within a simplified scenario. FIG. 1 illustrates a cylindrical component (100) for which it is desired to define an interface surface for interfacing the cylindrical component (100) with another component, which may have different expansion properties. The resulting interface surface (110) is specifically designed to minimize or eliminate stresses due to differential expansion rates of the components interfaced.

The interface surface (110) is defined, at least in part, with reference to a center of growth (120), a sizing sphere (130) and a projection line (140). To find the theoretical interface surface (110), an axis of volumetric expansion (150) is defined. This is the axis (150) along which the component (100) will expand and contract. If a component or component assembly is substantially symmetrical about a longitudinal axis, it will generally be advisable to select that axis as the axis of volumetric expansion.

Next, the sizing sphere (130) is defined. The actual size of the sizing sphere (130) can vary, but from a practical perspective of manufacturing, a good diameter for the sphere would be 1.4 times that of the cylinder or component diameter. However, the sphere illustrated in FIG. 1 is many times larger with respect to the cylinder simply for illustration purposes. The center of the sphere (130) is located on the axis (150) and may be centered with respect to the component (100) or component assembly. The location of the sphere (130) along the axis (150) is determined by where the interface between the components is supposed to be located.

The center of the sphere (130) defines a center of growth (120). The center of growth (120) is also a point that will be at the intersection of two or more planes which each include a portion of one or more interface surfaces between components. Subsequent design steps to identify the interface surface (110) will insure that the center of growth (120) is the intersection of two or more planes which each includes a portion of one or more interface surfaces between components.

The perimeter of the cylinder (100) is then projected onto the sizing sphere (130). The line defined by the projection of the cylinder (100) onto the sizing sphere (130) is the projection line (140). Accordingly, the projection line (140) is an intersection between the component(s) (100) and the sizing sphere (130). In the illustrated implementation, the projection line (140) forms a circle where the cylinder (100) is projected onto the sizing sphere (130).

It is now possible to define the desired interface surface (110). A number of planes are considered, where each of the planes contains, or is defined by, a point on the projection line (140), a tangent to that point on the projection line (140), and the center of growth (120). An infinite number of such planes exist. The common surface that is tangent to all of these planes is the theoretical interface surface (110).

In the illustrated example, in three dimensions, the theoretical interface surface (110) comprises a conical surface with its apex at the center of growth (120). Accordingly, an interface surface or surfaces between components with differential rates of volumetric expansion may be formed along the theoretical interface surface (110). The significance of this configuration and the interaction of these interfaces with other components will be discussed in more detail below.

Exemplary Implementation and Operation

Figure 2B:
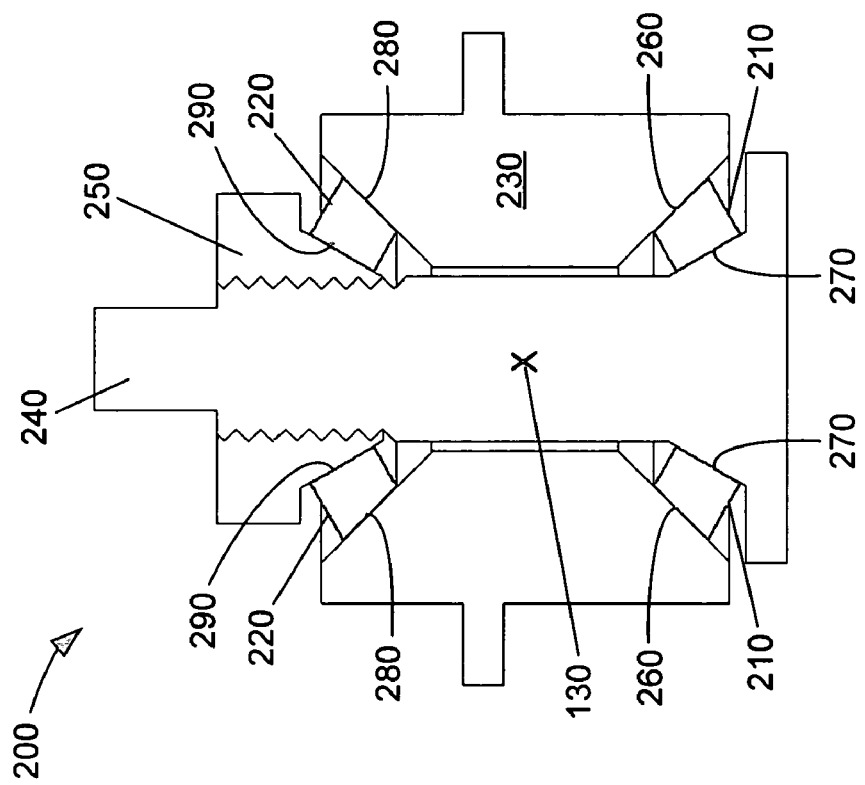
FIG. 2B illustrates a cross section view of the assembly shown in FIG. 2A.
Figure 2A:
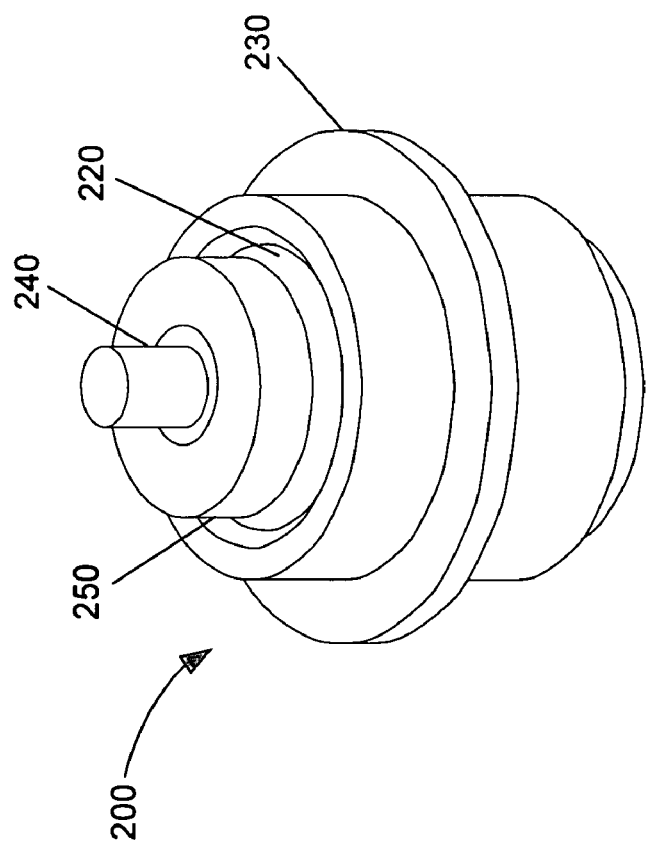
FIG. 2A illustrates a perspective view of an assembly having components of differential volumetric expansion rates according to one exemplary embodiment.

FIGS. 2A-B illustrate an assembly (200) having components with different volumetric expansion rates. The illustrated assembly is, for example, an electrical pass through assembly (200). However, the principles described herein can be applied to designing interfaces for components in a wide variety of assemblies including, but not limited to, cathode air connections, fuel connections, electrical pass throughs and sensor pass throughs. In any instance where components are interfaced in an assembly that experiences a wide variance in temperature and where the components may have different volumetric expansion rates, the principles described herein can be used to optimally design the interfaces between the components.

In the present example, the pass through assembly (200) generally includes first and second seals (210, 220), pass through hub (230), electrical post (240), and nut (250). As shown in FIG. 2A, these seals (210, 220) are annular in shape. FIG. 2B shows the seals (210, 220) and the other components of the assembly (200) in cross section. Electrical post (240) extends through hub (230) and is secured thereto by nut (250). The seals (210, 220) are located concentric to the cylindrical hub (230).

Similar to the exemplary cylindrical component (100) of FIG. 1, the geometry of interfaces between the seals (210, 220) and the nut (250), hub (230) and post (240) are partially defined with respect to a center of growth (130) located in a central portion of the assembly (200). As indicated above, the center of growth (130) is the intersection of the lines drawn along interfaces between the components, i.e., the seals (210, 220), nut (250), hub (230) and post (240). Each of theses components may have a different volumetric expansion rate, e.g., a different coefficient of thermal expansion (CTE's). However, with interfaces designed according to the principles described herein, the different expansion rates of the components will result in slippage between the components along the interfaces rather than potentially damaging stress on the components.

The configuration of the first seal (210) has first seal interfaces (260, 270) between the electrical post (240) and the hub (230), respectively. The second seal (220) has second seal interfaces (280, 290) between the nut (250) and the hub (230), respectively. As a result, each side of the assembly (200) is sealed with respect to the other. During thermal cycling, each of the components, including the seals (210, 220), the hub (230), the electrical post (240), and the nut (250), expand and contract at different rates due to differences in their CTE's. In spite of these differential rates of expansions, the seals (210, 220) remain in substantially sealing contact with the hub (230), the electrical post (240), and the nut (250) without a significant increase in thermal stresses due to thermal expansion. This result is due to the configuration of the assembly by which the first seal interfaces (260, 270) and the second seal interfaces (280, 290) act as shear planes whereby the components slip with respect to each other when expansion or contraction occurs. To achieve this, the seals (220, 210) are designed according to the method described herein, for example, with respect to FIG. 1 and FIG. 3.

Due to the slippage that can occur between components, differences in CTE's between the components result mainly in shear stresses, rather than substantial compressive or tensile forces. The magnitude of the shear stress is a function of the friction between the surfaces and any load that exists on the component before any expansion occurs, known as the preload. If no preload is applied, then there will be no shear stress at the interface during temperature excursions regardless of the CTE mismatch of the materials used for the various components of the assembly. Instead, the shear planes act as slip planes. The net effect is that the components move relative to each other along this interface plane instead of becoming loose or tightening up and producing excessive stress in the interface.

Further, a suitable lubricant or lubricating seal may be applied to the slip planes. Such a lubricant may provide for a reduced coefficient of friction, thereby allowing for the application of a sealing preload force without a substantial increase in shear stresses due to thermal expansion. An example of a suitable lubricating seal may include a liquid metal. Such a seal would be suitable for thermally cycled assemblies, such as fuel cell systems, and would provide further sealing to the component interfaces thereby reducing, for example, leakage of gas and/or fuel.

In fuel cell systems, the reliable sealing of pass-throughs and connections is desirable to minimize pressure drops and keep flammable gasses from mixing with air thus leading to an explosive mixture. Reduction of overall pressure drops may allow for reduced pressure generation. Reduced pressure generation may, in turn, provide for a reduction in overall system size and cost, which may broaden the applicability of fuel cell systems.

Furthermore, fuel cell systems according to the present system may utilize components with substantially different CTE's. As a result, fuel cell designers may be able to choose component materials without having to attempt to match CTE's between components. This freedom of design may provide for increased fuel cell efficiencies and lower costs. Accordingly, the present configuration provides for reliable sealing of the assembly during thermal cycling while minimizing thermally induced stresses.

Figure 3:
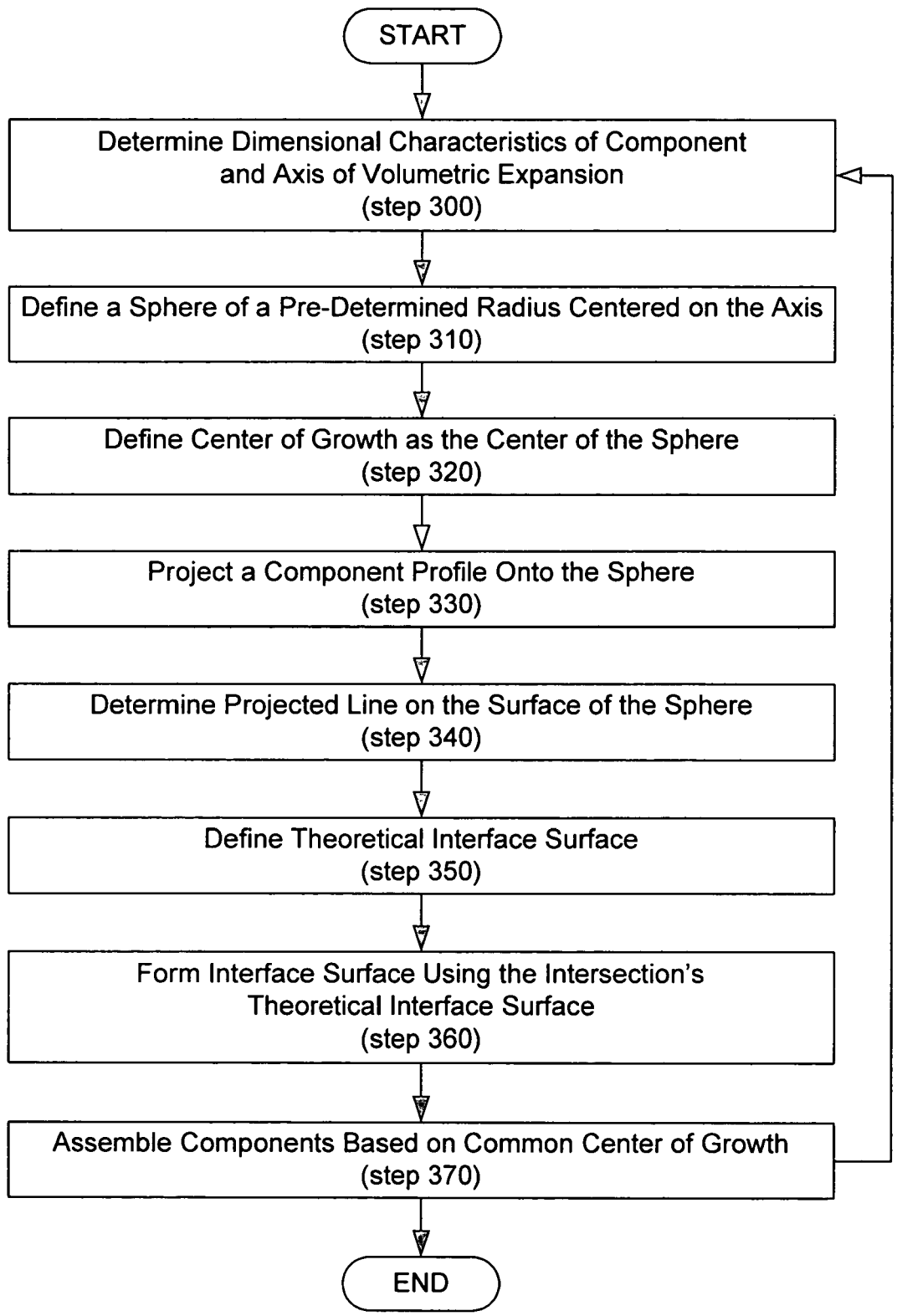
FIG. 3 is a flow chart describing a method of forming an assembly having components of differential volumetric expansion rates according to one exemplary embodiment.

FIG. 3 is a flowchart illustrating a method of forming an interface surface for an assembly of components having different rates of volumetric expansion. The method begins by determining dimensional characteristics of a component (step 300) including a design dictated axis of volumetric expansion. These dimensional characteristics include the three-dimensional growth or expansion characteristics of the component. The three-dimensional growth may be due to a number of factors, including thermal cycling or volumetric expansion and contraction due to liquid adsorption, or chemical interaction such as the swelling of plastic when immersed in ink or other liquids.

Once the dimensional characteristics have been determined, a sphere of a pre-determined radius is defined (step 310). The radius may be determined by using such factors as the dimensional characteristics of the component as determined above (step 300). The actual size of the sizing sphere can vary, but from a practical perspective of manufacturing, a good diameter for the sphere would be 1.4 times that of the cylinder or component diameter. The center of the sphere lies on the axis of volumetric expansion and defines a center of growth (step 320). Formation of the theoretical interface surfaces is based, at least in part, on the center of growth. The center of growth is used in subsequent processes whereby any number of components may be assembled in a device or assembly with any number of materials having differing rates of volumetric expansion.

The component profile is then projected onto the sphere (step 330) resulting in a perimeter of the component being projected onto the sizing sphere. Treating this projected perimeter as a line (step 340) (a "projection line"), one can define an infinite set of planes that each contains the center of growth (i.e., the sphere center), a point on the projection line, and a tangent to that point on the projection line. A determination of the common surface that is tangent to all of these planes defines a theoretical interface surface (step 350). In the case of a generally cylindrical component, the theoretical interface surface would be a conical surface. The component interface surfaces are then formed based on the theoretical interface surface (step 360).

The theoretical interface surface may then be used to form a portion of a second component with a complimentary interface according to the process described above. The first and second components may be made of materials with different coefficients of volumetric expansion, such as different coefficient of thermal expansion. Further any number of components may be formed in any combination according to the above process. Once the components are formed, they are then assembled (step 370) or interfaced such that their centers of growth are three-dimensionally coincident. This allows the components to expand and contract at different rates along shear or slip planes designed into the interfaces. Accordingly, the present method may facilitate the design of fuel cell systems by allowing designers to focus on the best materials for the intended function while focusing less on the CTE's of each of the materials. This freedom of design facilitates the use of cost efficient materials, which may improve the viability of fuel cell systems.

As described above, fuel cell system having components of different CTE's may experience thermal stresses during thermal cycling. These stresses can be quite large as the system is cycled between ambient temperatures to temperatures of 500-1000 C. As a result, these stresses can cause the ceramic components and substrates of the fuel cell system to crack thereby reducing the overall life of the fuel cell system. In the current method, each of these assemblies may interact with each other in a deliberate manner so as to allow for the expansion or contraction with a minimum of compressive stresses.

Alternative Embodiments

While the embodiment illustrated in FIG. 2 shows an electrical pass through for use in a fuel cell system, those of skill in the art will appreciate that the present method may be used to form any number of systems in which the components are made of materials that expand or contract differently to system variables. In fuel cell systems, the system variable is primarily thermal expansion.

Figure 4:
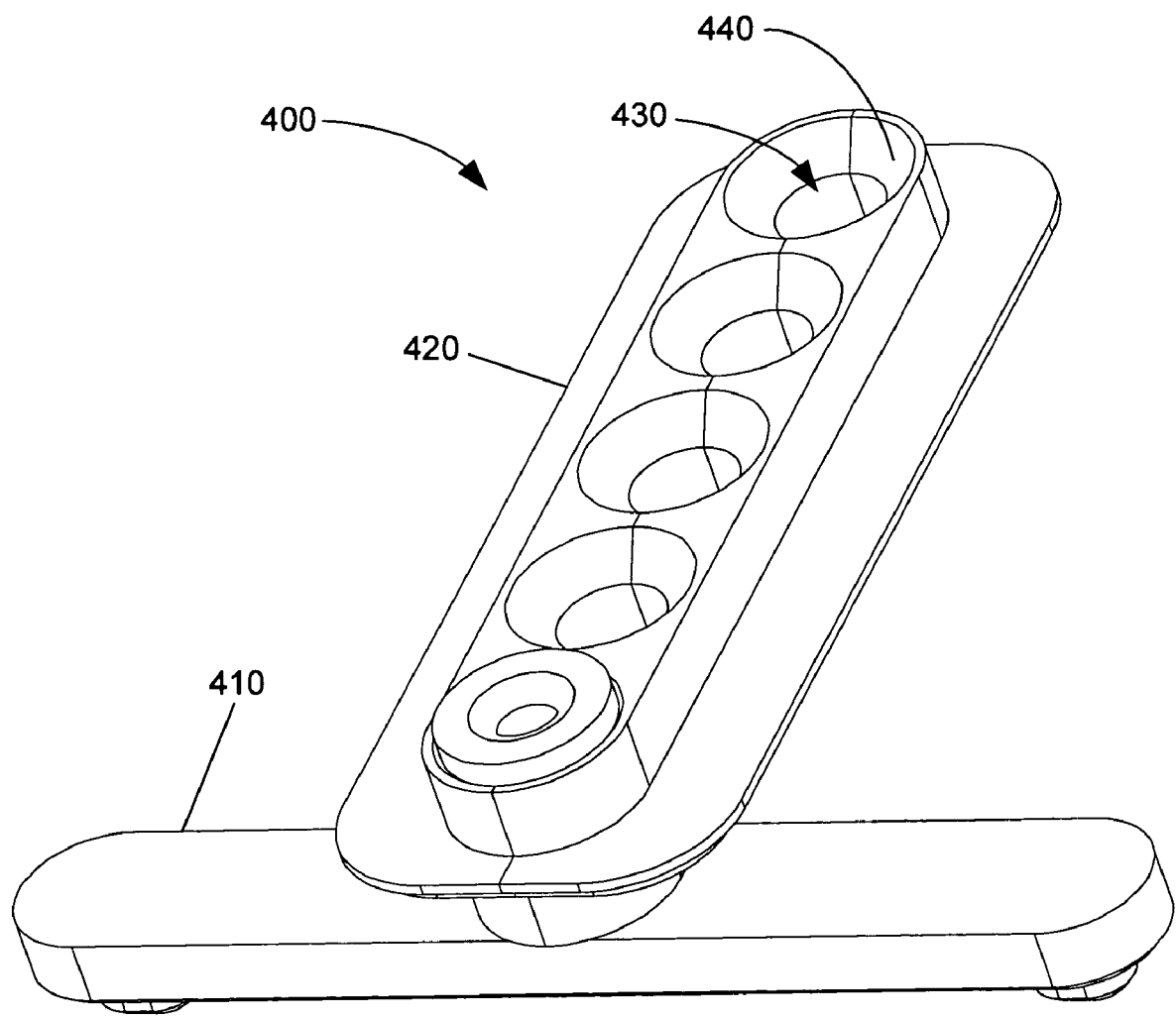
FIG. 4 illustrates a perspective view of an assembly having multiple components of differential volumetric expansion rates according to one exemplary embodiment.

FIG. 4 illustrates a ceramic retention component assembly (400) formed according to the process described above with reference to FIG. 3. The component retention assembly (400) includes a ceramic part (410) and a ceramic retention feature (420) with a plurality of pass-throughs (430) defined therein. The pass-throughs (430) include complimentary interfaces (440) formed according to the present method. The pass-throughs are configured to be coupled to the ceramic part (410) such that the interfaces of the ceramic part (not shown) slip with respect to the complimentary interfaces (440) in response to thermal expansion. Accordingly, the present method may be utilized to form a variety of components for use in assemblies having components of differential volumetric expansion rates, such as fuel cell systems. Further, the present method is not limited to the use of small or individual components.

Figure 5:
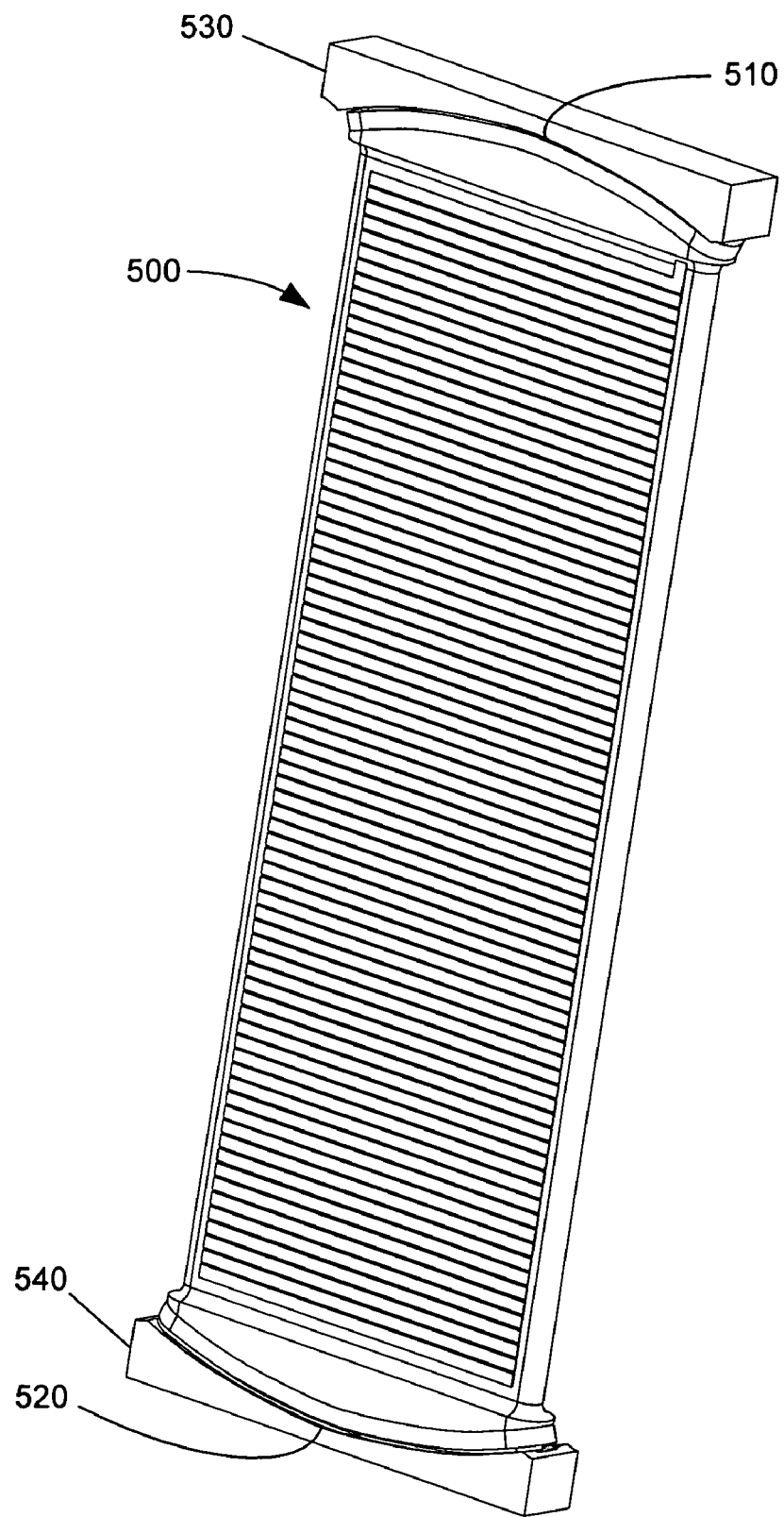
FIG. 5 illustrates a perspective view of an SOFC stack assembly having components of differential volumetric expansion rates according to one exemplary embodiment.

FIG. 5 illustrates a SOFC stack (500), in which the sealing interfaces (510, 520) have been formed according to the method described herein. Such a configuration minimizes or eliminates thermal stresses in the stack while maintaining the seal necessary for efficient operation. Accordingly, the sealing interfaces (510, 520) act as shear planes between the SOFC stack (500) and stack support members (530, 540) as the entire assembly undergoes thermal cycling. The slippage along the shear planes minimizes or reduces the shear stresses in the SOFC stack (500), thereby reducing the failure rate due to cracking or seal failure. This reduction in turn leads to longer life of the SOFC stack (500) and lower failure rates, which increases the viability fuel cell systems.

In other implementations (not shown), the system may include the use of a liquid metal seal disposed on or near the surfaces of the component interfaces. Such a configuration further seals the components while allowing for a dynamic seal that minimizes thermal stresses in an assembly and allows slippage along the shear plane.

In still other systems (not shown), volumetric expansion may be affected by mismatches in the fluid affinity or other similar characteristics of each of the components. Accordingly, the method described herein may be used to form any number of components for use in systems where each of the components has different volumetric growth rates in response to system variables. Such a method provides for components that retain their sealing or other relational characteristics throughout volumetric growth cycling or other system changes.

The preceding description has been presented only to illustrate and describe the present method and apparatus. It is not intended to be exhaustive or to limit the disclosure to any precise form disclosed. Many modifications and variations are possible in light of the above teaching. It is intended that the scope of the invention be defined by the following claims.

What is claimed is:

1. A method of forming a thermally cycled component assembly, comprising:
    forming a first component including:
        determining dimensional characteristics of said first component,
        defining an axis of volumetric expansion for said first component,
        projecting a sphere having a center on said axis,
        defining the center of said sphere as a center of growth of said first component,
        projecting a perimeter of said component onto said sphere to define a projection line, and
        forming an interface surface of said first component based on a plurality of planes each of which includes said center of growth, a point on said projection line and a tangent to that point on said projection line.

2. The method of claim 1, further comprising forming a second component having a complimentary interface surface configured to associate with said interface surface.

3. The method of claim 2, further comprising assembling said first and second components by interfacing said interface surface and said complimentary interface surface to form said assembly.

4. The method of claim 3, further comprising forming a shear plane between said interface surface and said complimentary interface surface that allows slippage during volumetric cycling of said first and second components.

5. The method of claim 4, further comprising allowing said shear plane to reduce thermal stress in said first and second components.

6. The method of claim 1, further comprising forming a plurality of components by:
    determining dimensional characteristics of each component,
    defining an axis of volumetric expansion for each component,
    defining a center of growth for each of said components, and
    forming an interface surface for each of said components with respect to the center of growth for that component.

7. The method of claim 6, wherein said forming an interface surface further comprises:
    for each component, locating a sphere of predetermined radius with a center on said axis of volumetric expansion;
    locating said sphere along said axis based on a desired location for said interface surface; and
    defining the center of said sphere as the center of growth for that component.

8. The method of claim 7, further comprising:
    projecting a perimeter of that component on said sphere to form a projection line; and
    forming an interface surface of that component based on a plurality of planes each of which includes the center of growth for that component, a point on the projection line for that component and a tangent to that point on the projection line.

9. The method of claim 8, further comprising assembling said components.

10. The method of claim 9, wherein assembling said components further comprises assembling said components such that each of said centers of growth are substantially coincident.

11. The method of claim 6, wherein said center of growth for each of said components is the same point.

12. The method of claim 6, wherein said components comprise components used in a thermally cycled device.

13. The method of claim 12, wherein said thermally cycled device comprises a fuel cell system.

14. The method of claim 6, wherein said components comprise an electrical pass through assembly.

15. The method of claim 6, wherein said components comprise a ceramic retention feature assembly.

16. The method of claim 6, wherein said components comprise an end cell seal assembly.

17. The method of claim 13, wherein said thermally cycled device comprises a solid oxide fuel cell system.

18. The method of claim 2, further comprising disposing a seal between said interface surface and complimentary interface surface.

19. The method of claim 18, wherein said seal comprises a liquid metal seal

20. The method of claim 6, wherein each of said components have different rates of expansion.

* * * * *

UNITED STATES PATENT AND TRADEMARK OFFICE
CERTIFICATE OF CORRECTION

PATENT NO.        : 7,736,817 B2                                              Page 1 of 1
APPLICATION NO.   : 10/677024
DATED             : June 15, 2010
INVENTOR(S)       : Arthur et al.

It is certified that error appears in the above-identified patent and that said Letters Patent is hereby corrected as shown below:

On the Title page, in Item (75), Inventors, in column 1, line 1-2, delete
"Gary Tarver," and insert -- Gary D. Tarver, --, therefor.

In column 8, line 49, in Claim 19, delete "seal" and insert -- seal. --, therefor.

Signed and Sealed this

Ninth Day of November, 2010

David J. Kappos
*Director of the United States Patent and Trademark Office*